United States Patent Office 2,913,201
Patented Nov. 17, 1959

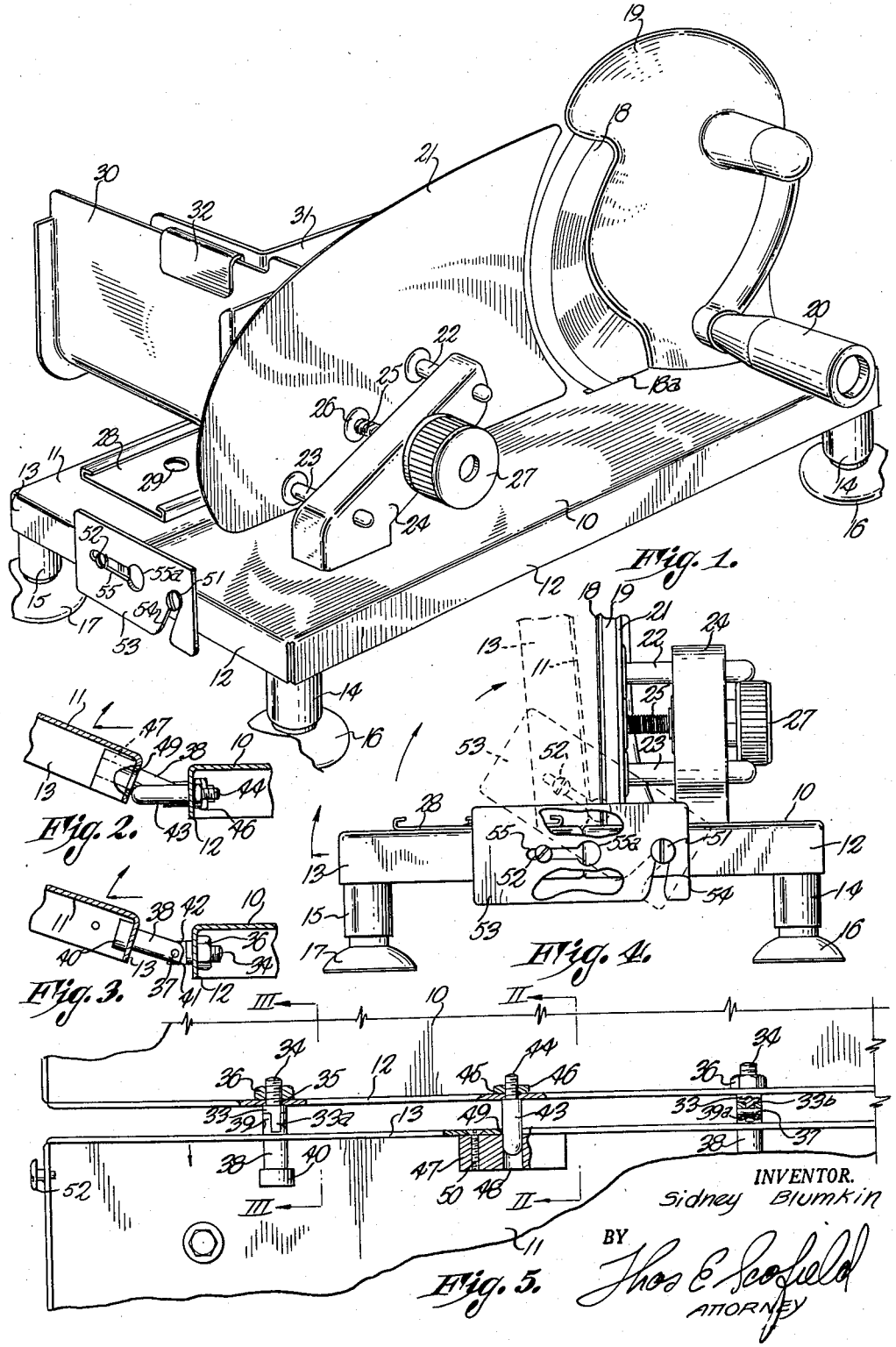

2,913,201

KITCHEN IMPLEMENT PLATFORM AND CONNECTING MEANS THEREFOR

Sidney Blumkin, New York, N.Y., assignor to John C. Hockery, trustee for Henry J. Talge and Foster L. Talge, Kansas City, Mo.

Application May 13, 1957, Serial No. 658,552

8 Claims. (Cl. 248—19)

This invention relates to supporting platforms or bases for kitchen implements and refers more particularly to a relatively large such supporting platform or base adapted to carry both kitchen implements and the work thereof, while being collapsible or foldable when not in use to minimize the storage space taken up thereby. The invention additionally relates to the connecting means between foldable base portions which permit sections of the platform or base to be manipulated relative one another without being disconnected from one another.

More and more mechanical kitchen implements of various types and uses are being provided for the home. At least some of these new home kitchen implements are ones which previously were substantially confined to commercial use. In particular, this latter type of kitchen implements provided for home use may include relatively heavy, large, cumbersome and expensive apparatus. Rotary meat slicers are an example of this latter type. While the convenience and utility of many of these new types of kitchen machines, implements and devices cannot be denied, all of them, especially the bulky ones, amplify the storage problem which has always existed in most home kitchens. That is, storage space is generally at a premium in any kitchen and it becomes particularly so when a new, large, space-occupying kitchen device such as a high grade meat slicer is purchased. In the case of a meat slicer especially, it is desirable to be able to store it on shelves and out of the reach of children. A meat slicer requires a relatively large, massive, stable base to mount the cutter blade, its drive, the backing mechanism for the cutter, etc., while simultaneously providing a broad stable platform for mounting the conventional reciprocable slide which carries the meat or other food stuffs to be sliced. Such a complete assembled device may have dimensions of over a foot of length and a half to three-quarters of a foot of width without being unusually large for the purpose. The storage problem thus becomes acute. Another important consideration lies in that it is not desirable to have completely disassemblable kitchen devices to ease storage problems, first, because the complexity of the devices prohibits disassembly, second, because of the difficulty of reassembling and, third, for the reason that such a completely disassemblable device, when reassembled, might not be stable and thus offer elements of danger to the user.

Therefore, an object of the invention is to provide a platform or base for kitchen implements which may be collapsed or folded to reduce the amount of storage space therefor.

Another object of the invention is to provide such a platform or base for kitchen implements which is foldable or collapsible to reduce the space required for storage thereof yet which is not disassembled by said folding or collapsing and which provides an extremely rigid, strong and stable support and work surface when the segments of the platform or base are not folded or collapsed.

Another object of the invention is to provide such a platform or base for kitchen implements which is collapsible or foldable to reduce the amount of space required for storage thereof wherein means are provided to rigidly lock and fix the segments of the base together when the segments are not folded or collapsed relative one another whereby to provide a safe, rigid, immovable platform for the work of the implement.

Yet another object of the invention is to provide such a collapsible or foldable platform or base for kitchen implements wherein the collapsed or folded deck sections may be locked in the collapsed or folded position whereby to maintain it in such position thus avoiding any accidental fold-out or opening up of the base when not desired.

Yet another object of the invention is to provide unique and serviceable means for constantly connecting separable and foldable deck sections of a platform or base for kitchen implements which permit a rigid interconnection of the sections for use as a base yet also permit separating and folding or collapsing of the segments relative one another without detachment therefrom.

Still another object of the invention is to provide a platform base as described having at least a pair of collapsible deck sections which are of simple yet strong and rigid construction as well as connecting means permitting collapsing of the sections relative one another or rigid positioning relative one another, the connecting means being of great strength, simplicity of construction and ease of manufacture, as well as having a long life under hard use.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Fig. 1 is a three-quarter perspective view from above of a kitchen implement platform or base embodying the invention, a conventional meat or food slicer being shown mounted thereon to illustrate the manner of the use of the base.

Fig. 2 is a view corresponding to one taken along the lines 2—2 of Fig. 5 in the direction of the arrows but showing the base sections separated from one another.

Fig. 3 is a view corresponding to one taken along the lines 3—3 of Fig. 5 in the direction of the arrows but showing the base sections separated from one another.

Fig. 4 is an end view of the inventive platform or base shown in operating position in full lines with the locking means therefor also in full lines and in dotted lines with the locking means therefor also in dotted lines illustrating the folded or collapsed position of one segment of the platform or base.

Fig. 5 is a bottom view of the connection of the two deck sections of the kitchen implement platform or base of Figs. 1 and 4, the deck sections being shown partly separated one from the other better to illustrate the engaging means connecting them.

Referring to the drawings, at 10 and 11 are shown the top surfaces of the two deck sections of the inventive platform or base which have downwardly extending flanges circumferential thereto numbered 12 and 13, respectively. It should be particularly noted that, as may be seen in Fig. 5, there are abutting downwardly extending edges 12 and 13 between the two top surfaces 10 and 11. Pairs of legs 14 and 15 are fixed to the underside of the top surfaces 10 and 11 by conventional welding or other means and suction cups 16 and 17 are fixed to the bottom ends of these legs. Mounted on these two deck sections are the kitchen implement means, which in this case comprise a meat slicer having a blade 18 mounted in a housing 19 driven by handle 20 in rotation. Meat or food stuff backing board 21 is movable mounted relative the top deck section surface 10 by pins 22 and 23 engaging openings in support arm 24. Threaded screw 25 rotatably based in and attached to seat 26 has knurled knob 27 fixed on the free end thereof to move the backing board laterally back and forth relative support arm 24 by rotation of screw 25. Guideway 28 is fixed to the other top surface 11 of the other deck section by bolts 29 and has carriage 30 engageable therewith which carries food stuff backing board 31 thereon by tap 32 overlying the rear flange of the carrier 30. All of these parts are more or less conventional and do not comprise a part of the invention. They are merely described here to show how a typical kitchen instrument would be mounted on the two deck sections. The blade 18 passes through an opening 18a in the one deck section top surface 10.

Turning now to the means connecting the two separate and independent deck sections one with the other, such means are of two forms and are best seen in Figs. 2, 3 and 5. In the paired outer connections, a pair of shaft bases 33 are fixed to the downwardly extending shelf or edge 12 by threaded lesser diameter portions 34 extending through openings 35 in the shelf 12 and being engaged by nuts 36. Bases 33 have outwardly extending flange portions 33a which have an opening therethrough 33b to receive a pin or shaft 37. The portions of the shaft bases abutting shelf 12 are of a greater diameter than the openings 35 in the shelf. A pair of engaging shafts 38 are fixed to the shaft bases 33 by their bifurcated small ends 39 being engaged by the pins 37 extending through openings 39a in the bifurcated portions 39 and openings 33b. Openings (not shown) are also formed in the abutting shelf 13 next the shelf 12 spaced laterally from the ends of the shelves substantially the same distance as the openings 35 in the shelves 12 and vertically from the upper surface of the deck sections substantially the same distance as openings 35 as well. These openings in shelf 13 are slightly greater in diameter than the outer diameter of the shafts 38 so they may pass therethrough. The free ends of the shafts 38 which extend through those openings have enlarged heads 40 thereon to prevent the free ends of the shafts 38 passing through the openings in the shelf 13. Thus, the shafts 38 may slide back and forth in the openings in the shelf 13, limited only by the enlarged heads 40, which are of a greater diameter than the diameter of the openings in the shelf 13. As may be seen in Fig. 3, in side view, the bifurcated sections 39 of the shafts 38 have a substantially flat lower abutting portion 41 to engage the abutting faces 33c of the shaft bases 33 to prevent the pivotable deck section 11 from passing below the level of the other deck section 10 even when it is fully separated therefrom. Sections 39 also have rounded upper portions 42 to permit swivelling of the pivotable deck sections 11 upwardly relative the other section 10. Likewise, the upper portion of flange portions 33a are rounded (in side view) as at 33d to permit such engagement and clearance of the parts.

A second engaging means is provided for the deck sections preferably centrally of the previously described engaging shafts 38 and shaft bases 33. Such means comprise a rigid shaft 43 preferably having a rounded free end with a lesser diameter base portion 44 which extends through opening 45 in the shelf 12, preferably at the level of the openings 35, and is engaged by nut 46 on the inner side of the shelf 12. The rigid shaft 43 is preferably of lesser length than the distance from the outer face of the shelf 12 to the inner face of the enlarged heads 40 on shafts 38 whereby, when the deck sections are separated as fully as permitted by the enlarged heads 40 on the shafts 38, the shaft 43 is completely free of the shelf 13 on the pivotal deck section. Fixed to the inside surface of the shelf 13 is socket mounting 47 which has socket or opening 48 centrally thereof of an outer diameter substantially that of or slightly greater than the outer diameter of the shaft 43. An opening 49 of substantially the same diameter is formed in the shelf 13 opposite the opening 48 and at the same vertical level as the opening 45 in the opposite shelf. Screws 50 extend through other openings 50a in the shelf 13 and fix the socket mounting 47 thereto.

Means for locking the deck sections in either horizontal or tilted position comprise a pair of engaging lugs, which in this case are screws 51 and 52 attached to or threaded into the end shelves 12 and 13. A locking plate 53 having a pair of slots 54 and 55 formed therein to engage the two screws 51 and 52, respectively, is employed to interengage the two locking lugs or screws. The head of screw 51 is so large as to not be engageable in any part of slot 55. Slot 54 extends out one edge of the plate and has its other end closed in the plate. The end of slot 54 extending out the edge of the plate 53 is preferably enlarged whereby to guide the slot in engagement of the locking lug or screw 51. Slot 55 has an enlarged end portion 55a at the end thereof next the slot 54 and a lesser width section extending away therefrom. The process of engagement of the plate 53 with the locking lugs, when the decks are fixed in a horizontal position as in Figs. 1 and 4, comprises fitting the enlarged portion 55a of slot 55 over screw 52 and then sliding plate 53 along so screw 52 moves into the lesser diameter portion of the slot 55. The plate may then be rotated around the screw 52 so the slot 54 engages the screw 51 behind the enlarged head thereof. The distance between the opposite ends of the two slots is preferably slightly greater than the distance between the opposite far sides of the screws 51 and 52 so that a very slight play is allowed between the two deck sections, but not enough to permit disengagement thereof.

To engage the locking plate 53 with the locking screws 51 and 52, when the pivotal deck section is in the position of Fig. 4, requires the same process with first engagement of the screw 52 in the slot 55 and then subsequent engagement of the screw 51 by the slot 54.

It should be noted that pairs of legs may be attached to the nonpivoting deck section or to both deck sections if desired, but the invention is operable with the construction shown.

From the foregoing it will be seen that the invention is adapted to attain all of the ends and objects hereinbefore set forth together with other advantages which are obvious and inherent to the apparatus and method described.

It will be understood that certain features and subcombinations are of utility and may be employed without reference to other features and subcombinations, this being contemplated by and within the scope of the claims.

As many possible embodiments may be made of the invention without departing from the scope thereof, it is to be understood that all matter hereinabove set forth is to be interpreted as illustrative and not in a limiting sense.

Having thus described my invention, I claim:

1. A kitchen implement and work receiving platform and base comprising a pair of deck sections each having upper substantially flat surfaces, and at least one side flange fixed to and extending substantially normal to said deck section, said flanges adapted to at least substantially contact and lie flush with one another in a substantially vertical position when the deck section upper surfaces are so positioned to form a substantially continuous flat horizontal upper deck, a pair of rigid shaft bases each fixed at one end to the side flange of one first deck section and extending outwardly therefrom a distance at least equal to the least thickness of the side flange of the other deck section, a pair of matching engaging openings formed in the side flange of the other second deck section each to receive at least a portion of one shaft base when the deck section upper surfaces are forming a substantially continuous flat horizontal deck, each shaft base of such vertical thickness as to engage the upper and lower walls of its matching engaging opening and substantially rigidly support the decks in horizontal position, and a pair of engaging shafts each pivotally fixed at one end to one shaft base and having an enlarged head on the other end positioned on the other side of the second deck section flange opposite the shaft base connections to the first deck section flange whereby the second deck section may be pulled laterally away from the first deck section until the shaft bases are free of the openings and then pivoted so its upper surface is at a substantial angle to the upper surface of the first deck section.

2. A kitchen implement and work receiving platform and base as in claim 1 wherein the shaft bases have each at least one flat abutting surface substantially parallel to the deck section flange mounting them, and the engaging shaft ends coupled with the shaft bases have at least one abutting surface flat and substantially at right angles to the axis of the shaft in its lower portion and rounded in its upper portion.

3. A kitchen implement and work receiving platform and base as in claim 1 including locking means engageable with engaging means fixed to the ends of the first and second deck sections when the deck sections are positioned to form a substantially continuous flat horizontal deck whereby to maintain the two deck sections positioned relative one another until said locking means is removed and said locking means also engageable with the engaging means on each deck section when the second deck section is pivoted at an angle to the first deck section whereby to maintain the two deck sections positioned relative one another at an angle until said locking means is removed.

4. A kitchen implement and work receiving platform and base as in claim 1 including at least one engaging stud on the same end of each of said deck sections, and locking means comprising a plate having a slot with an enlarged end adapted to fit over the stud on one deck section with the enlarged end thereof and engage the stud with the remainder of the slot and a second slot spaced from the first slot and at an angle thereto with one end thereof opening from the edge of the plate whereby, when one of the studs on said deck sections is engaged by said enlarged end slot, the second stud may be engaged by the second slot, the distance from the closed end of the slot opening out of the edge of the plate to the end of the other slot most distant therefrom is not less than the distance between the two engaging studs on the deck sections when the two deck sections are positioned together to form a continuous substantially flat horizontal surface, the distance between the closed end of the second slot and the end of the other slot also not greater than the distance between the locking studs when the second deck section is pivoted at its preferred angle relative the first deck section.

5. A kitchen implement and work receiving platform and base as in claim 1 wherein a single pair of legs is fixed to each deck section normal thereto and adjacent the outer edge of the deck section away from the deck section interengaging means.

6. A kitchen implement and work receiving platform and base comprising a pair of deck sections each having upper substantially flat surfaces, and at least one side flange fixed to and extending substantially normal to said deck section, said side flanges adapted to at least substantially contact and lie flush with one another in a substantially vertical position when the deck section upper surfaces are so positioned to form a substantially continuous flat horizontal upper deck, a pair of rigid shaft bases each fixed at one end to the side flange of one first deck section and extending outwardly therefrom a distance at least equal to the least thickness of the side flange of the other deck section, a pair of matching engaging openings formed in the side flange of the other second deck section each to receive at least a portion of one shaft base when the upper surfaces of the deck sections are forming a substantially continuous flat deck, each shaft base of such vertical thickness as to engage the upper and lower walls of its matching engaging opening and substantially rigidly support the decks in horizontal position, a pair of engaging shafts each pivotally fixed at one end to one shaft base and having an enlarged head on the other end positioned on the other side of the second deck section flange opposite the shaft base connections to the first deck section flange, at least one rigid shaft fixed at its base to the side flange of the first deck section, a shaft socket mounted on the side flange of the second deck section to receive the rigid shaft, the length of the rigid shaft extension from the face of the flange of the first deck section less than that of the combined engaging shafts coupled with their shaft bases whereby the second deck section may be pulled laterally away from the first deck section until the rigid shaft is free of its socket and then pivoted so its upper surface is at a substantially angle to the upper surface of the first deck section.

7. A kitchen implement and work receiving platform and base as in claim 6 wherein the deck section flange openings, the shaft bases, the rigid shaft and the rigid shaft socket are all positioned substantially at the same level whereby to permit the upper surfaces of the deck sections to lie so as to form a substantially continuous flat upper deck.

8. A kitchen implement and work receiving platform and base as in claim 6 wherein the rigid shaft and its socket are positioned intermediate the two engaging shafts and their shaft bases.

References Cited in the file of this patent

UNITED STATES PATENTS

| | | |
|---|---|---|
| 158,336 | Tiemann | Dec. 29, 1874 |
| 176,362 | Schuyler | Apr. 18, 1876 |
| 1,923,241 | Todd | Aug. 22, 1933 |
| 2,610,857 | Cook | Sept. 16, 1952 |